United States Patent [19]

Whelan

[11] Patent Number: 4,601,033

[45] Date of Patent: Jul. 15, 1986

[54] CIRCUIT TESTING APPARATUS EMPLOYING SIGNATURE ANALYSIS

[75] Inventor: Michael Whelan, Titusville, N.J.

[73] Assignee: Siemens Corporate Research & Suppport, Inc., Iselin, N.J.

[21] Appl. No.: 571,256

[22] Filed: Jan. 16, 1984

[51] Int. Cl.⁴ .................................................. G06F 11/00
[52] U.S. Cl. .................................... 371/25; 324/73 R
[58] Field of Search ................... 371/15, 16, 20, 24, 371/25, 26, 27; 364/200, 900, 481; 340/146.2; 324/73 R; 382/33

[56] References Cited

U.S. PATENT DOCUMENTS

| | | | |
|---|---|---|---|
| 4,039,813 | 8/1977 | Kregness | 371/26 |
| 4,100,532 | 7/1978 | Farnbach | 364/481 |
| 4,301,513 | 11/1981 | Haag | 364/900 |
| 4,313,700 | 1/1982 | Nishiura | 371/25 |
| 4,404,542 | 9/1983 | Thomas | 364/900 |
| 4,433,412 | 2/1984 | Best et al. | 371/25 |
| 4,441,183 | 4/1984 | Dussault | 371/25 |
| 4,498,172 | 2/1985 | Bhauser | 371/15 |
| 4,503,536 | 3/1985 | Panzer | 371/26 |
| 4,510,572 | 4/1985 | Reece | 371/25 |

OTHER PUBLICATIONS

"Hexadecimal Signatures Identify Trouble Spots in Microprocessor Systems", by G. Gordon et al., Electronics Magazine, Mar. 3, 1977, pp. 89-96.

"Die Signatur–Analyse", by K. Heine, Elektronik Magazine (1979) vol. 1, pp. 48-51.

"Logic-State and Signature Analysis Combine for Fast, Easy Testing", by I. Spector, Electronics Magazine, Jun. 8, 1978, pp. 140-145.

Primary Examiner—Michael R. Fleming
Attorney, Agent, or Firm—John Francis Moran

[57] ABSTRACT

Apparatus is disclosed for testing an electrical circuit by means of signature analysis. Responses to a sequence of test patterns from the circuit under test are supplied to a linear feedback signature register (LFSR) which produces a signature signal at its output representing its current state in dependence upon its prior state and the received response signal. A programmed read-only-memory is addressed by these state signals of the LFSR and produces, at its output, a logical "1" signal if the current signature represents a permissible state of the LFSR and a logical "0" if the state is not permissable. This checking occurs throughout and during the testing sequence in contrast to conventional signature analysis wherein the comparison only occurs at the end of the testing sequence.

3 Claims, 8 Drawing Figures

CIRCUIT TESTING APPARATUS EMPLOYING SIGNATURE ANALYSIS

BACKGROUND OF THE INVENTION

The present invention relates to apparatus for either on-line or off-line testing of an electrical circuit. More particularly, the invention relates to circuit testing apparatus employing a linear feedback shift register ("LFSR") for signature analysis.

Methods and apparatus for testing electrical circuits by "signature analysis" are well known. Commercial devices such as the Hewlett Packard HP 5004A signature analyzer have been available for a number of years. Publications describing such devices and methods of testing include "Hexadecimal Signatures Identify Trouble Spots in Microprocessor Systems" by G. Gordon et al., *Electronics Magazine*, Mar. 3, 1977, pp. 89–96; "Die Signatur-Analyse" by K. Heine, *Elektronik Magazine* (1979), Volume 1, pp. 48–51; "Logic-state and Signature Analysis Combine for Fast, Easy Testing" by I. Spector, *Electronics Magazine*, June 8, 1978, pp. 140–145.

With the signature analysis method of testing, an electrical circuit having an input and an output is connected at its output to a linear feedback shift register (LFSR) and connected at its input to an automatic test pattern generator (ATG). The ATG applies test patterns sequentially to the input of the circuit under test (CUT) for a prescribed number of test cycles. The output signals produced during this test sequence causes the LFSR to pass through a succession of specific states so that, after completion of the test, the LFSR contains a prescribed, known "signature" (bit pattern) if the ATG, the CUT and the LFSR are working properly.

Upon the completion of the test, the bit pattern in the LFSR is compared to the known bit pattern of the correct signature (i.e., the signature of a properly-working CUT) to determine whether any of the elements of the test system (ATG, CUT and LFSR) is faulty.

During the test, the contents of the LFSR change from one "signature" to the next as the LFSR moves through its successive states. For a 16-bit LFSR, for example, there are $2^{16}$ different possible signatures. Normally, however, the LFSR passes through only a small percentage of this maximum number of signatures during a given test.

Even assuming that the ATG and the LFSR hardware itself is functioning properly, the signature analysis method of circuit testing has two basic problems:

(1) It is difficult, if not impossible, to determine when (during which test cycle) the error appeared in the CUT from the final LFSR signature at the completion of the test sequence (assuming that the final signature is incorrect).

(2) It is possible for the LFSR to land in the correct state at the conclusion of a test sequence, indicating the correct signature, even though the CUT is faulty and produces multiple errors.

To understand the latter problem, it is necessary to analyze the error detection capabilities of the LFSR using probabilistic mathematics. It will be assumed, throughout this analysis, that all output symbols produced by the CUT are equally likely and there is no correlation between them. It will be assumed also (1) that the LFSR is designed to produce a maximal length random number sequence if continually presented with null symbols; (2) that the LFSR cannot get into a particular state from two different states upon receipt of the same input symbol and, similarly, (3) that the LFSR can only make a transition from one specific state to another upon receipt of one specific symbol.

Consider a test symbol with an ATG, CUT and LFSR connected together, which passes through N test cycles. The CUT therefore produces a string of N output symbols during the testing procedure which could be a correct sequence a or, in the alternative, an i symbol error sequence, b. b is thus a sequence of N symbols which differs from the sequence a in exactly i positions. It is assumed, in this regard, that all i symbol errors (for any particular value of i) are equally likely.

During the test sequence the LFSR starts in some initial state, $S_0$, and compresses the string a or b of N symbols. In compressing these symbols, the LFSR will pass through N+1 states in total (including the initial and final states). However, since it is possible that states may be revisited, the number of distinct states may be less than this. We let $A_i$ denote the average number of distinct states visited when a string of i symbols is compressed; we let M denote the total number of LFSR states (e.g., $2^{16}$ for a 16-bit LFSR).

Now, therefore:

$$A_0=1$$

(i.e., the initial state)

$$A_{i+1}=A_i+P,$$

where P is the probability that the $(i+1)^{st}$ symbol causes a transition to a state which has not previously been visited. Since all symbols are equally likely, it follows that all next states are equally likely.

$$P=(M-A_i)/M;$$

i.e., the number of unvisited states divided by the total number of states.

$$A_{i+1}=A_i+(M-A_i)/M=A_i(M-1)/M+1$$

Let $$\alpha=(M-1)/M;$$

and $$A_{i+1}=\alpha A_i+1$$

Hence, $$A_0=1,\ A_1=\alpha+1,\ A_2=\alpha^2+\alpha+1,$$

$$A_i=\alpha^i+\alpha^{i-1}+\ldots+\alpha^2+\alpha+1.$$

This geometric series can be summed to yield:

$$A_i=(1-\alpha^{i+1})/(1-\alpha)$$

It follows that the fraction of states visited (on the average) during the compression of i symbols can be written as $A_i/M$.

In considering the error coverage of the LFSR, it is necessary to define some additional notation:

$a_i$=the $i^{th}$ symbol in a; and likewise
$b_i$=the $i^{th}$ symbol in b;
$S_i(a)$=the LFSR state after processing the first i symbols of a; and $S_F(a)=$ the LFSR state after a has been completely compressed.

Furthermore, $P_i=$ the probability that the LFSR detects an i-symbol error (i.e., an erroneous sequence yields an incorrect signature); and $R_i=$ the probability that the LFSR does not detect an i-symbol error (i.e., an erroneous sequence yields the correct signature). By definition $P_i=1-R_i$.

We wish to determine $P_i$ and $R_i$ for $i \geq 1$.

Case 1: Consider a 1-symbol error sequence. Let b differ from a in the $j^{th}$ symbol.

$$S_{j-1}(a)=S_{j-1}(b)$$

Since the $j^{th}$ symbols differ, it follows that $$S_j(a) \neq S_j(b).$$

Now since the string match on all remaining symbols, it follows that $$S_k(a) \neq S_k(b),$$

for all $k \geq j$, and hence $$S_F(a) \neq S_F(b)$$

$$P_1=1 \text{ and } R_1=0$$

Case 2: Consider 2-symbol errors. Let the errors be in positions k and l and assume without loss of generality that $k \leq l$.

$$S_{k-1}(a)=S_{k-1}(b)$$

$$S_k(a) \neq S_k(b)$$

$$S_j(a) \neq S_j(b),$$

for $k \leq j \leq l$.

Now since a and b match in all symbols after the $l^{th}$ symbol, in order for the erroneous string to be accepted (produce the correct final signature), we must have:

$$S_l(a)=S_l(b).$$

The probability of this occuring given that $S_{l-1}(a) \neq S_{l-1}(b)$ and $a_l \neq b_l$ is (1/M), where M is the total number of states (symbols) of the LFSR (input alphabet), so that:

$$P_2=(M-1)/M, \ R_2=1/M.$$

It should be noted that this result is independent of the relative positions of the errors.

Case 3: Consider the general case of i-symbol errors, for $i \geq 2$. Let the last two symbol errors be in positions k and l, with $k \leq l$. Two subcases must be considered.

Case A: $S_k(a)=S_k(b)$.

After compressing the string up to and including the $(i-1)^{st}$ erroneous symbol, the LFSR state matches the corresponding state for the correct sequence.

Hence, it follows that:

$$S_l(a) \neq S_l(b)$$

and, since there are no more errors, it follows that $$S_F(a) \neq S_F(b).$$

Hence i-symbol errors of this form will always be detected.

Case B: $S_k(a) \neq S_k(b)$.

Given this condition, the probability of having $S_F(a)=S_F(b)$ is 1/M, (i.e., the last error may "correct" the state), but the probability that $S_k(a)=S_k(b)$ is simply $P_{i-1}$ (i.e., the probability that an $(i-1)$ symbol error is detected):

$$R_i=P_{i-1}/M \text{ and } P_i=1-P_{i-1}/M.$$

It is then a relatively simple matter to show that:

$$P_i = \sum_{j=0}^{i-1} \left( -\frac{1}{M} \right)^j$$

For $M \geq 1$, this can be solved to yield:

$$P_i = \frac{M\left(1 - \left(\frac{-1}{M}\right)^i\right)}{1+M} \quad \text{for } i \geq 1.$$

For an eight (or more) bit LFSR, $P_i$ can be approximated by:

$$P_i \approx \frac{M-1}{M}, i > 1, \text{ and}$$

$$P_i = 1, i = 1$$

It has thus been shown that the signature analysis method of testing an electrical circuit is guaranteed to detect all erroneous strings which differ in exactly one symbol from the correct string. The probability that the LFSR will detect other erroneous string has also been determined and shown to be practically independent of the number of erroneous symbols (once there are more than one) and independent of the relative positions of the erroneous symbols.

There is therefore a finite probability that the LFSR will arrive at a correct final state, although the circuit under test is, in fact, faulty.

SUMMARY OF THE INVENTION

It is an object of the present invention to provide apparatus for testing an electronic circuit using the signature analysis technique which is able to determine, with high probability, when the CUT produces an incorrect output symbol in response to a test stimulus.

It is a further object of the present invention to provide apparatus of the above-noted type for which the probability of error detection is substantially increased as compared to signature analysis apparatus of the prior art.

These objects, as well as other objects which will become apparent in the discussion that follows, are achieved, according to the present invention, by connecting the address input of a programmed, read-only-memory (ROM) to the output of the LFSR so that the successive state signals produced by the LFSR during the test sequence become addresses for the ROM. The ROM is programmed to produce a first signal at its data output upon receipt of a state signal if the state signal indicates a permissible state of the LFSR during a test of the electrical circuit, and to produce a second signal at its data output upon receipt of a state signal if this state signal does not represent a permissible state of the LFSR.

According to a preferred feature and embodiment of the invention, a second programmed read-only-memory (ROM) is directly connected to the output of the electrical circuit under test (CUT). This second ROM is programmed to produce a first signal at its data output upon receipt of a permissible test response of the CUT, to produce a second signal at the data output upon receipt of a test response which is not a permissible response of the CUT.

The foregoing, as well as other objects, features and advantages of the present invention will become apparent from the following, more particular description of the preferred embodiments of the invention, as illustrated in the accompanying drawings.

DESCRIPTION OF THE PREFERRED EMBODIMENT

Figure 1:
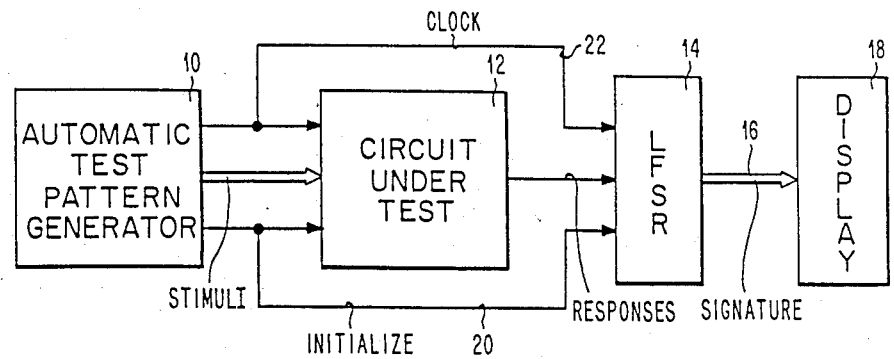
FIG. 1 is a block diagram of a simple signature analyzer of the type known in the prior art.

The preferred embodiments of the present invention will now be described with reference to FIGS. 1-8 of the drawings. Identical elements in the various figures are designated with the same reference numerals.

FIG. 1 illustrates a simple signature analyzer of the type known in the prior art. With this analyzer, an automatic test pattern generator (ATG) 10 applies a sequence of test patterns (stimuli) to the circuit under test (CUT) 12. The response to each test pattern is passed to a linear feedback shift register (LFSR) 14 which changes its state upon receipt of each response. The state of the LFSR 14 is reflected by a "signature": namely, the distinct bit pattern appearing at the parallel output lines 16 of the LFSR. This signature is passed to a digital display device 18 which displays a unique set of characters defined by each different signature. Both the CUT 12 and the LFSR 14 are brought to their initial state at the beginning of the test by a pulse on an input line 20. Each stimulus and response is clocked into the CUT and the LFSR, respectively, by a clock pulse on input line 22.

In practice, the operator of the signature analyzer shown in FIG. 1 notes the displayed signature only at the conclusion of each test sequence. He then compares this signature with the correct signature noted in a test manual to determine if the CUT is operating properly.

Figure 2:
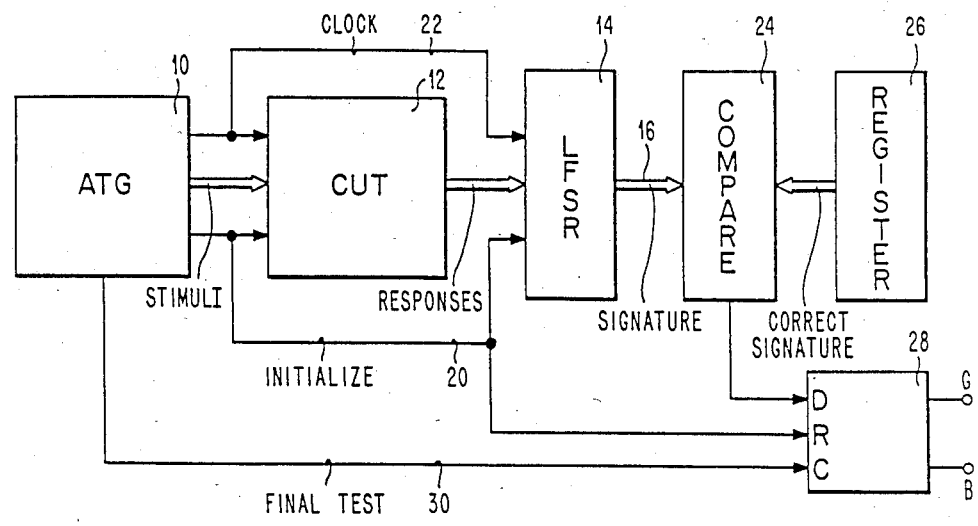
FIG. 2 is a block diagram of an automatic signature analyzer of the type known in the prior art.

The manual comparison step may be eliminated by replacing the display device 18 with a comparator 24 as shown in FIG. 2. This comparator compares the final signature provided by the LFSR at the conclusion of a test sequence with the correct signature stored in a memory or register 26. If the two signatures are equal, an output pulse is clocked into a "D" type flip-flop 28. If the signatures are not the same, the flip-flop remains in its original, reset state. A timing pulse indicating the final test is received from the ATG on a separate line 30.

The automatic test apparatus of FIG. 2 thus produces a signal on the "good" ("G") output of the flip-flop 28 if the CUT test is operating properly. Otherwise, a signal will be produced on the "bad" ("B") output of this flip-flop.

Figure 3:
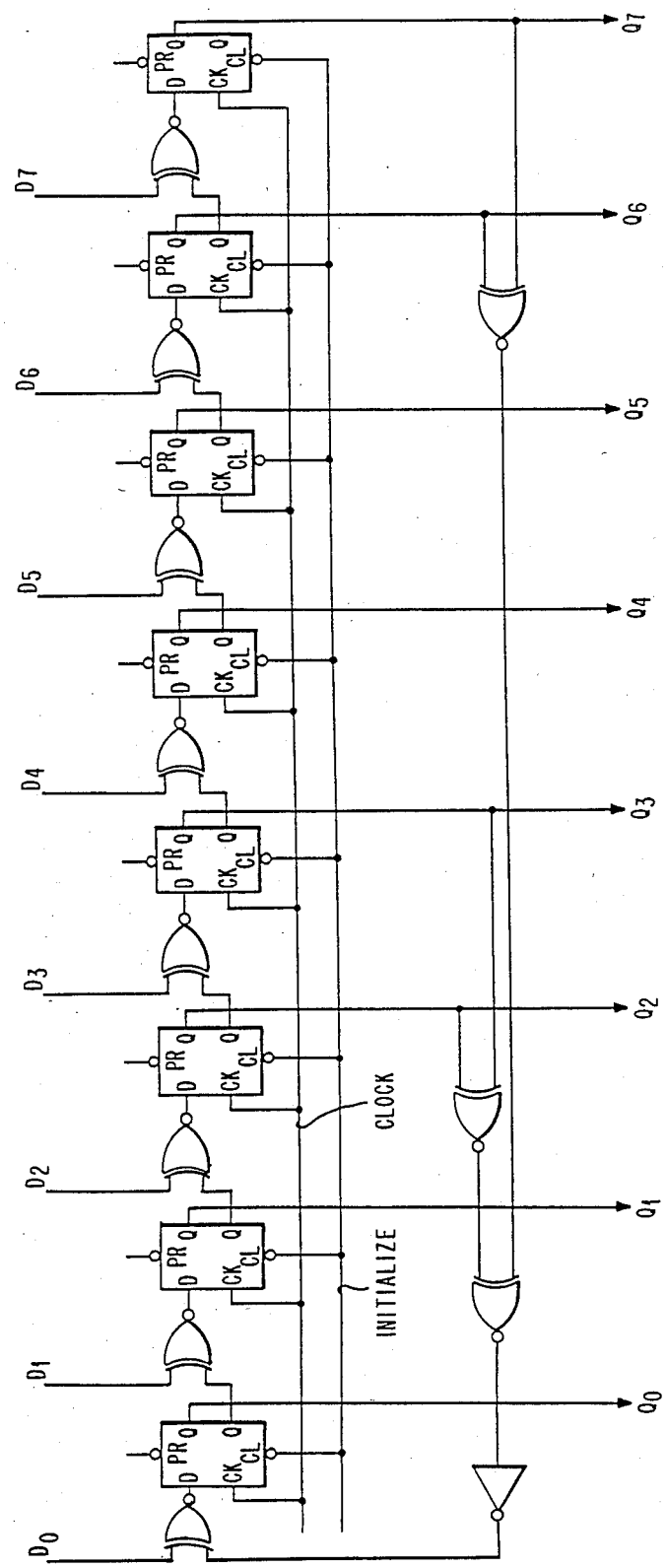
FIG. 3 is schematic diagram of a typical LFSR.

FIG. 3 illustrates a typical 8-bit LFSR. This circuit receives digital signals on one or more of the input lines $D_0-D_7$ and produces a unique "signature" on output lines $Q_0-Q_7$. The "initialize" and "clock" inputs are also shown in this schematic.

Figure 4:
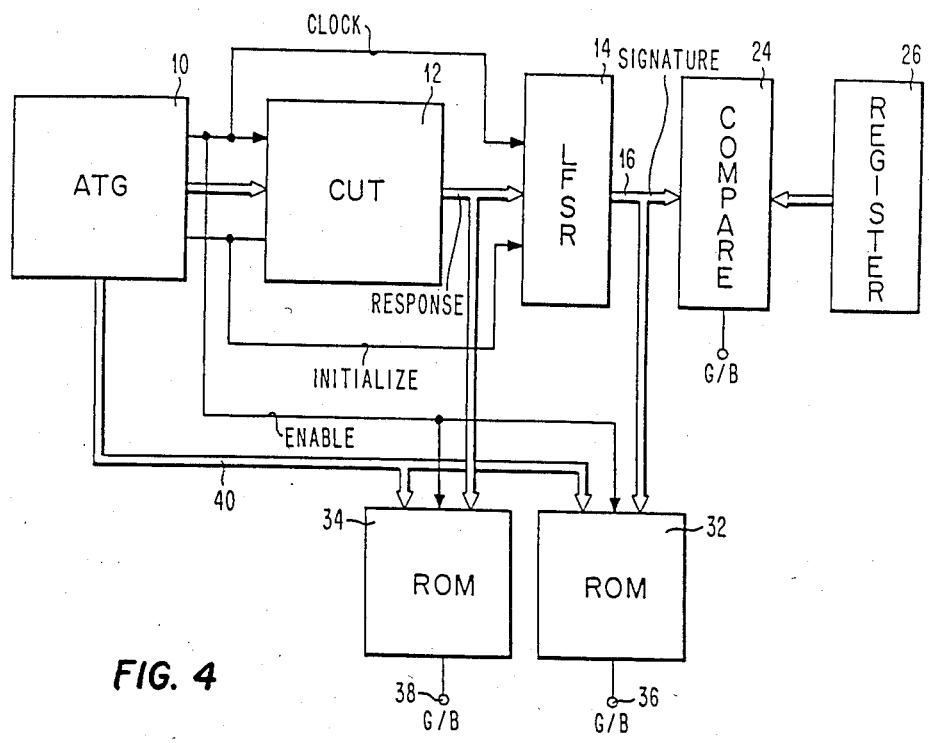
FIG. 4 is a block diagram of a signature analyzer according to a preferred embodiment of the present invention.

FIG. 4 illustrates signature analysis apparatus which employs the principles and concepts of the present invention. The apparatus in FIG. 4 is similar to the testing apparatus of FIGS. 1 and 2 except that the output of either the LFSR 14 or the CUT 12, or both, is supplied as an address to a read-only-memory (ROM) 32 or 34, respectively. The ROM's 32 and 34 are bit-wise addressable; that is, the contents of each address is only a single bit which is passed to a single data output terminal 36 or 38, respectively.

In the case of the ROM 32, the single bit locations having addresses corresponding to all of the permissible states of the LFSR which occur during a test sequence in response to the application of each input bit contain a "1"; all other locations of this ROM contain a "0". Similarly, the bit locations of the ROM 34 at addresses which correspond to permissible responses of the CUT 12 contain a "1"; all other locations contain a "0". Consequently, when the ROM 32 or ROM 34 is addressed, the signal appearing at the output terminal 36 or 38 will indicate whether the state as indicated by its state signal (of the LFSR) or response (of the CUT) is a permissible state or response, respectively.

As may be seen in FIG. 4, the ROM's 32 and 34 may also receive a portion of their respective addresses from the ATG 10 via bus lines 40. This digital number defines the specific test or stimulus which is being applied to the CUT 12. The use of these address lines, of course, increases the memory space requirement of the ROM 32 and/or 34, thus considerably increasing the cost of the test apparatus.

The provision of the additional address lines 40 makes it possible to identify the correctness of each and every CUT response and/or each and every LFSR signature for the particular test conducted. Since the actual CUT responses and LFSR state signals visited by the apparatus during an entire test sequence are only a small proportion (e.g., 1:100) of the total number of conceivable responses and possible state signals, the considerable saving in memory space achieved by eliminating the address lines 40 may well be worth the inconsiderable reduction in the probability of error detection.

Accordingly, the application of address bus 40 to ROM's 32 and 34 is optional and may be practical for only relatively short addresses and/or test sequences. However, in view of the complexity of a typical CUT 12 the occassion for such a short sequence would be for a very limited number of cases.

Figure 5:
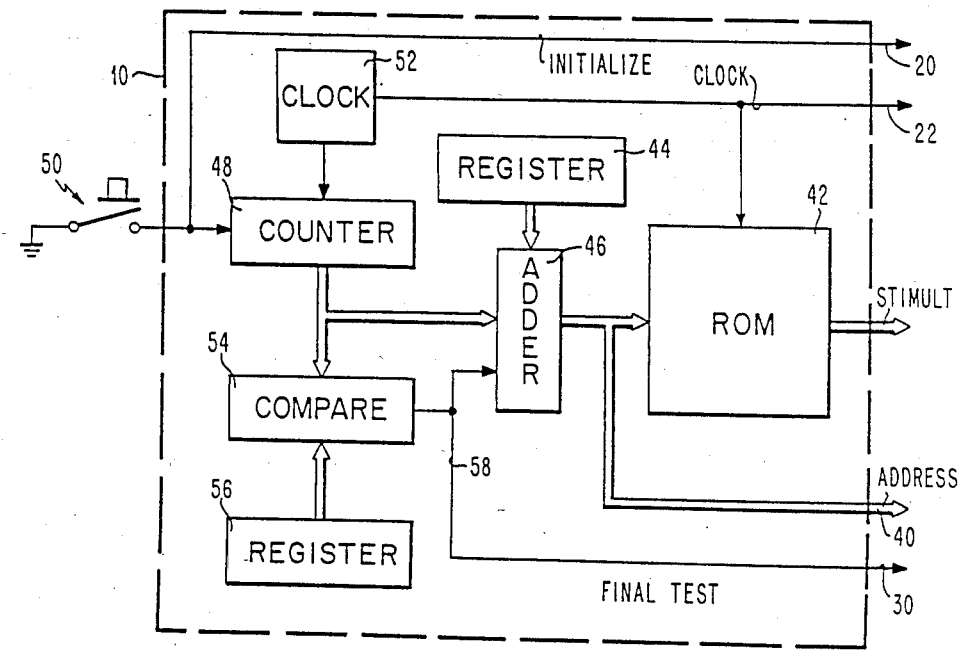
FIG. 5 is a block diagram of an automatic test pattern generator for use in the analyzer of FIG. 4.
Figure 6:
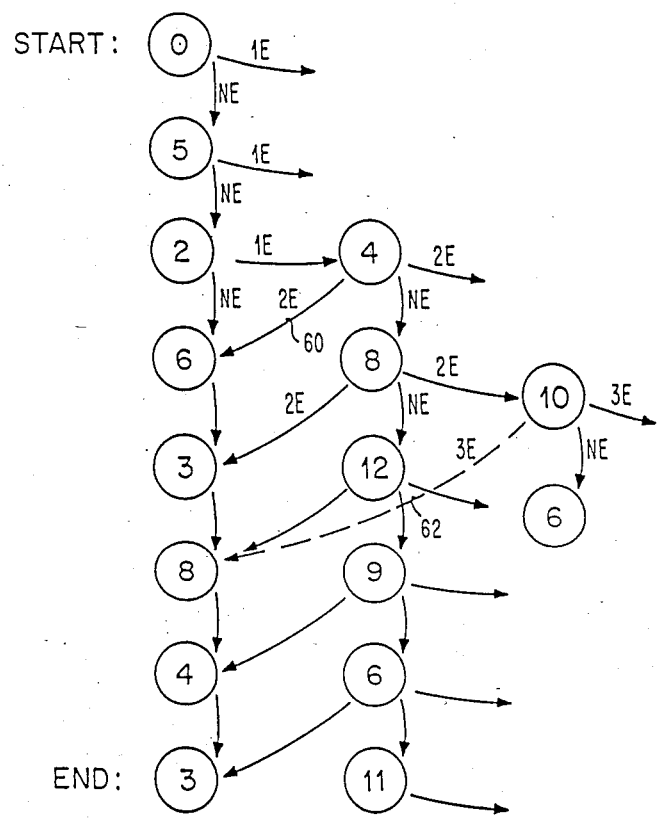
FIG. 6 is a state diagram illustrating possible states of an LFSR.

FIG. 5 illustrates the internal construction of the automatic test pattern generator (ATG) 10. This devices includes a ROM 42 in which is stored, at successive word locations, the test bit patterns for successive cycles of a test sequence. In fact, the ROM 42 may contain the test patterns for a large number of different test sequences, for example for different types of tests for a particular circuit 12 or for different test sequences for different circuits. The initial address for a test pattern sequence is selected by the operator by inserting this address in a register 44. Subsequent addresses are generated during each clock cycle by an adder 46 which receives a sequence of consecutive numbers from a counter 48.

This counter is manually reset by the operator at the start of each test by means of a push-button 50 and is then incremented automatically by a clock 52. The counter 48 counts upward from zero until all of the bit pattern stimuli of a test sequence have been addressed in the ROM 42. At the conclusion of the final test, the counter 48 reaches a number which the operator has stored in a separate register 56. When the outputs of the counter 48 and register 56 are equal, a comparator 54 presents a pulse at its output 58 which freezes the output of the adder 46.

Figure 7:
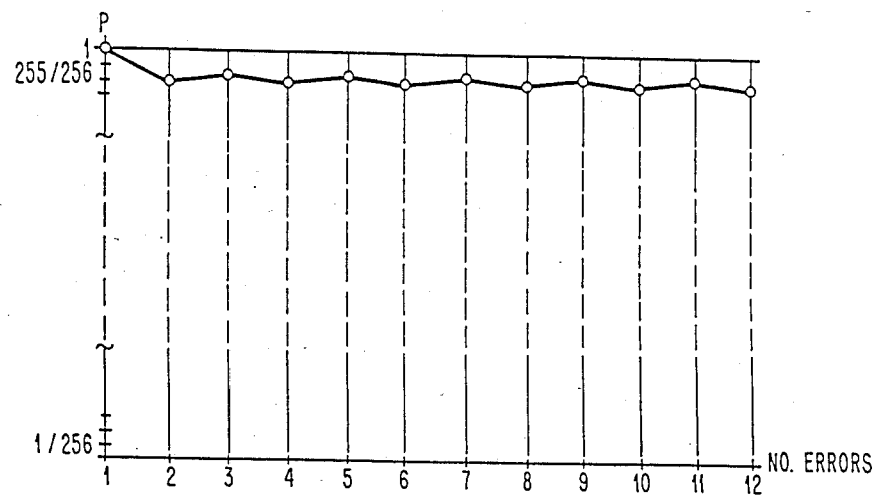
FIG. 7 is a graph showing the probability of error detection using a signature analyzer of the prior art.

In operation, the test apparatus of FIGS. 4 and 5 corrects the problem, illustrated in the state diagram of FIG. 7, that the LFSR may arrive at its correct final state at the conclusion of a test sequence, notwithstanding the fact that errouneous responses were received from the circuit under test. In FIG. 7, the states indicated in the left-hand vertical column represent the states of the LFSR resulting from correct responses of the CUT in a given test sequence. At the start of the test, the LFSR is initialized to the "0" state. If there is no error in the CUT response (indicated by "NE"), the LFSR will move to another state, which may be state "5" for example. After each response of the CUT, the LFSR moves to another state as is indicated by the arrows in FIG. 7. It is possible, of course, for the LFSR to occupy the same state (e.g., state "3") more than once during the test sequence.

If one error occurs, the LFSR will move from one sequence of states (the left-hand column in FIG. 7) to another sequence of states (the middle column). If there is only one error, then the LFSR will remain in this second sequence so that its final state (e.g., state "11" in FIG. 7) will be different than the final state (e.g., state "3") that would appear if there were no errors in the CUT responses. The problem arises, as is illustrated in FIG. 7, when two or more errors occur in the CUT responses. In this case, there is a small probability (approximately 1/M were M is the total number of LFSR states) that the LFSR will return to a state in the correct state sequence indicating that all test responses have been correct. Thus, in the example shown in FIG. 7, the LFSR may go from state "4" to state "6" via path 60 if two errors have occurred. Also, the LFSR may go from state "10" to state "8" via path 62 if three errors have occurred. In either case, the LFSR would end up in the proper state "3" at the conclusion of the test sequence.

The present invention serves to identify any states visited by the LFSR which are not permissible. In the diagram of FIG. 7, the states "0", "2", "3", "4", "5", "6" and "8" are permissible. Thus, if the LFSR were to enter state "12", for example, the ROM 32 would flag an error in the circuit under test.

Figure 8:
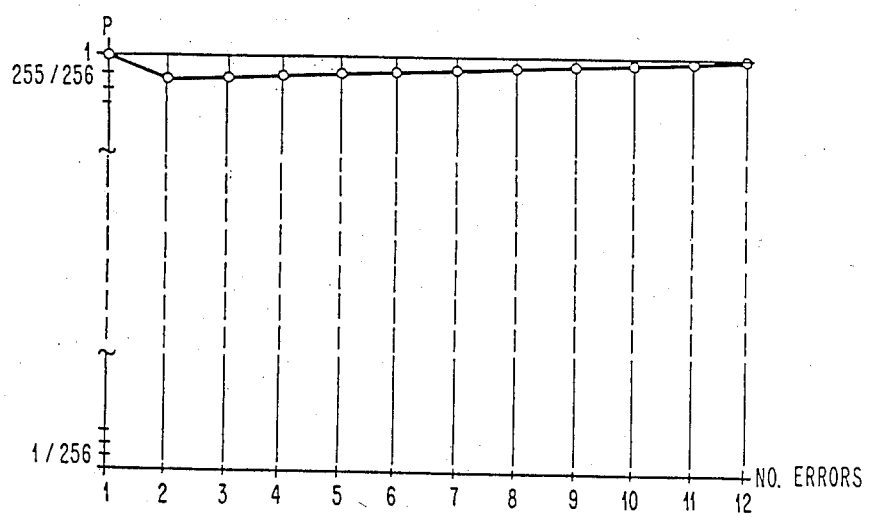
FIG. 8 is a graph showing the probability of error detection using the signature analyzer according to the present invention.

FIGS. 8 and 9 provide a comparison of the error detecting capability of the prior art signature analysis apparatus with respect to the apparatus of the present invention. On the abscissas of these diagrams are indicated the number of errors for a given test sequence and on the ordinates are indicated the probability of detecting these errors. FIG. 8 shows that the probability is one, in the prior art apparatus, for detecting one error but the probability drops to approximately 255/256 (for a 8-bit LFSR) in the case of two or more errors, assuming that the errors are independent. With the apparatus of the present invention, however, as is shown in FIG. 9 the probability of detecting errors drops initially to approximately 255/256, in the case of two errors, but then increases again asymptotically to one as the number of errors increases.

There has thus been shown and described a novel apparatus for testing an electrical circuit which fulfills all the objects and advantages sought therefor. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. Apparatus for testing an electrical circuit having a first input and a first output, said apparatus comprising, in combination:
    (a) test control means for applying a test sequence of test signals to said first input of said electrical circuit thereby to evoke, in response to each test signal, a response signal by said electrical circuit at said first output;
    (b) linear feedback signature register (LFSR) means, having a second output plus a second input, the second input is connected to said first output of said electrical circuit, the LFSR means producing a state signal at said second output representing the current state of said LFSR means, in dependence upon the prior state of said LFSR means and a received response signal;
    (c) programmed, first read-only-memory (ROM) means having a first data output plus a first address input, the first address input is connected to said second output of said LFSR means, the first ROM means producing a first signal at said first data output upon receipt of said state signal if said state signal represents a permissible state of said LFSR means during a test of said electrical circuit, and the first ROM means producing a second signal at said first data output upon receipt of said state signal if said state signal does not represent a permissible state of said LFSR means.

2. The apparatus defined in claim 1, further comprising:
    (d) register means, having a third output, for producing a signature signal at said third output representative of the proper final state of said LFSR means after the completion of a sequence of test signals; and
    (e) comparator means having a fourth output and a fourth input, the fourth input connected to said second output of said LFSR means, the comparator means having a fifth input which is connected to said third output of said register means, the comparator means producing a fifth signal at said fourth output if and only the signals received at said fourth input and said fifth input are equal;

whereby said fifth signal indicates that said LFSR means has arrived at the correct final state upon completion of said test sequence.

3. The apparatus defined in claim 2, further comprising programmed, second read-only-memory (ROM) means having a second data output plus a second address input, the second address input is connected to said first output of said electrical circuit, the second ROM means producing a third signal, at said second data output upon receipt of said response signal if said response signal constitutes a permissible response of said electrical circuit during a test thereof, the second ROM means producing a fourth signal at said second data output upon receipt of said response signal if said response signal does not constitute a permissible response of said electrical circuit.

* * * * *